(12) United States Patent
Katsuma et al.

(10) Patent No.: US 7,755,852 B2
(45) Date of Patent: Jul. 13, 2010

(54) OPTICAL ELEMENT MOLDING METHOD AND OPTICAL ELEMENT

(75) Inventors: Toshiaki Katsuma, Saitama (JP); Hajime Yamanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 36 days.

(21) Appl. No.: 12/181,379

(22) Filed: Jul. 29, 2008

(65) Prior Publication Data

US 2009/0052056 A1 Feb. 26, 2009

(30) Foreign Application Priority Data

Aug. 22, 2007 (JP) ............................ P2007-215746

(51) Int. Cl.
G02B 3/02 (2006.01)
G02B 3/00 (2006.01)
G02B 3/10 (2006.01)

(52) U.S. Cl. ..................... 359/718; 359/662; 359/721; 359/900

(58) Field of Classification Search ................. 359/718, 359/662, 708–712, 721, 900; 65/37; 362/335
See application file for complete search history.

(56) References Cited

U.S. PATENT DOCUMENTS

| 2004/0244422 | A1 | 12/2004 | Yoneda et al. |
| 2005/0011227 | A1* | 1/2005 | Sakai et al. ................. 65/29.21 |
| 2005/0053788 | A1 | 3/2005 | Terashima et al. |
| 2005/0178157 | A1 | 8/2005 | Yoneda |
| 2007/0180861 | A1 | 8/2007 | Hayamizu et al. |
| 2007/0253073 | A1 | 11/2007 | Terashima et al. |

FOREIGN PATENT DOCUMENTS

JP 2004-335080 A 11/2004

* cited by examiner

*Primary Examiner*—Jack Dinh
(74) *Attorney, Agent, or Firm*—Birch, Stewart, Kolasch & Birch, LLP

(57) ABSTRACT

A molding material is heated and pressed plural times when molded is an optical element having a radius of curvature smaller than a radius of a sphere having the same volume as the optical element. When such an optical element is molded, a closed space is formed between a molding material and a transfer surface of a mold in a state where the molding material is placed thereon. Thus, an appearance defect such as a recess is easily generated on the molded optical element. However, since the molding material is molded plural times, it is possible to place the molding materials on the transfer surfaces of the molds after a size of the closed space is adjusted so as not to generate the appearance defect prior to each heating/pressing process. Thereby, it is possible to suppress generation of an appearance defect in the molded optical element.

9 Claims, 3 Drawing Sheets

V: 12.30 mm³
r: 1.43 mm

V: 19.02 mm³
r: 1.66 mm

V: 6.94 mm³
r: 1.18 mm

V: 26.01 mm³
r: 1.84 mm

V: lens volume
r: radius of spherical preform having the same volume as lens

OPTICAL ELEMENT MOLDING METHOD AND OPTICAL ELEMENT

CROSS-REFERENCE TO RELATED APPLICATIONS

This application is based upon and claims the benefit of priority from the Japanese Patent Application No. 2007-215746 filed on Aug. 22, 2007; the entire contents of which are incorporated herein by reference.

BACKGROUND OF THE INVENTION

1. Technical Field

The invention relates to an optical element molding method and an optical element.

2. Description of the Related Art

In recent years, as optical devices have become smaller and more lightweight and have had more functions, various optical lenses used for optical systems have been developed. Particularly, in products employing a pick-up lens for an optical disk such as a DVD (Digital Versatile Disk), an increase in NA of the optical lens has been required. Also, recently, in a Blu-ray disk (a mass storage optical disk), a high NA lens has been used together with a blue-violet laser having a short wavelength in order to achieve high-density data recording. Thus, as might be expected, an increase in NA of the optical lens will be further required in the future. In addition, such a pick-up lens, for example, is required to have 0.45 to 0.5 NA for a CD (Compact Disk), 0.6 to 0.65 NA for the DVD, and 0.85 or more NA for the Blu-ray disk.

As a method of molding an optical lens (hereinafter, it is referred to as "optical element"), the most widely used is a press molding method of molding an optical element from a molding material by using a pair of molds having transfer surfaces including an optical transfer surface and a barrel die to which the molds are inserted. In the press molding method, the molding material is placed on a first mold, the molding material is pressed in a heat-softened state by the first and second molds, the transfer surfaces are transferred, and then the molding material is cooled. Thus, a desired optical element is molded.

In this case, an optical function surface of the optical element is defined as a range including an effective diameter (a range through which effective rays pass through the optical system) of the optical element and outside thereof. If a molding process is performed only for the range of the effective diameter, it is difficult to process the molding material in accordance with a designed shape in order to achieve a function of the optical element. Thus, the optical function surface is defined as a range in which the optical element is molded in accordance with the predetermined design shape for achieving a function of the optical element together with the range of the effective diameter thereof.

In addition, a radius of curvature in the case where the optical element is formed in an aspheric surface is defined as a radius of curvature in the vicinity of an optical axis of the optical element. Likewise, in the transfer surface of the mold and the surface of the molding material used for molding the optical element having an aspheric surface, the radius of curvature is defined as a radius of curvature in the vicinity of an optical axis of the optical element.

Generally, in order to response the requirement of high NA with a single lens, it is necessary to increase an effective diameter of an optical element and utilize even a highly inclined part on a lens surface as an effective diameter. Thus, a thickness of an outer peripheral part in the optical element decreases. Hence, in order to secure a thickness of the outer peripheral part necessary to process the optical element, a thickness in the vicinity of the optical axis of the optical element should increase. Thus, volume of the molding material increases. As a result, when the radius of curvature of the molding material becomes larger than the radius of curvature of the transfer surface, a closed space is formed between the molding material and the transfer surface of the mold in a state where the molding material is placed thereon. Thus, an appearance defect such as a recess is easily generated in the optical surface of the molded optical element.

To solve the problems mentioned above, JP 2004-335080 A (corresponding to US 2005/0053788 A and US 2007/0253073 A) describes a manufacturing method of molding a lens having a convex aspheric surface and having 0.8 or more NA with a high accuracy in lens surface. In this manufacturing method, by using a pair of the molds having transfer surfaces opposed to each other, the spherical molding material having a radius r is heat-softened and pressed, and a transfer surface is transferred. Thus, a desired lens is molded. When a lens having a convex aspheric surface of a radius of curvature R is molded, a condition that $r/R \leq 1.3$ is satisfied and a molding condition for properly suppressing pressing speed is proposed. Also, by satisfying the molding condition, it is effectively prevented to mold a lens in a state where air is trapped between the molding material and the transfer surface of the mold. Thus, it is possible to mold a lens having high accuracy in lens surface.

However, in a verification experiment performed by inventors, it was found that, even if the molding condition described in JP 2004-335080 A is satisfied, sometimes, a lens may have an appearance defect such as a recess due to molding of the lens in a state where gas is trapped between the molding material and the transfer surface of the mold.

SUMMARY OF THE INVENTION

The invention has been made in view of the above circumstances, and provides an optical element in which generation of an appearance defect is minimized and a new or improved optical element molding method.

According to an aspect of the invention, an optical element molding method includes: heating and pressing a molding material plural times when molding an optical element having a radius of curvature R smaller than r. r denotes a radius of a sphere having the same volume as the optical element to be molded.

With this method, the molding material is heated and pressed plural times when the optical element having the radius of curvature R smaller than the spherical radius r of the sphere having the same volume as the optical element to be molded, that is, the optical element having a relatively small radius of curvature R is molded. When such an optical element is molded, a closed space is formed between the molding material and the transfer surface of the mold in a state where the molding material is placed thereon. Thus, an appearance defect such as a recess is easily generated in the molded optical element. However, since the molding material is molded plural times, it is possible to place the molding material on the transfer surface of the mold after a size of the closed space is adjusted so as not to generate the appearance defect before each heating/pressing process. Thereby, it is possible to suppress generation of the appearance defect in the molded optical element.

In the optical element molding method, the optical element may have at least one convex surface. A shape of the optical element may be expressed by the following expression which is defined in a coordinate system in which an optical axis of the optical element is defined as a Z axis and a plane which is tangential to a vertex of the convex surface and which is perpendicular to the optical axis is defined as an X-Y plane, an X axis being orthogonal to the Z axis and a Y axis being orthogonal to the Z axis and the X axis.

$$Z_L(\rho) = C\rho^2/(1+\sqrt{1-KC^2\rho^2}) + \Sigma B_i \rho^i \quad (1)$$

where $Z_L(\rho)$ denotes a length of a perpendicular line being drawn from a point, which is on the convex surface and which has a distance $\rho$ from the optical axis, to the tangential surface, $\rho$ denotes the distance from the optical axis and is expressed by $\sqrt{x^2+y^2}$, C denotes a curvature of the convex surface and is expressed by 1/R R denotes a radius of curvature of the convex surface, K denotes a constant, $B_i$ denotes an i-th order aspheric coefficient, and i denotes a natural number equal to or larger than three A shape of a surface of the sphere may be expressed by the following expression which is defined in a coordination system in which a central axis of the sphere is defined as a Z axis and a plane which is tangential to a vertex of the surface of the sphere and which is perpendicular to the central axis is defined as an X-Y plane, an X axis being orthogonal to the Z axis and a Y axis being orthogonal to the Z axis and the X axis.

$$Z_P(\rho) = c\rho^2/(1+\sqrt{1-c^2\rho^2}) \quad (2)$$

where $Z_P(\rho)$ denotes a length of a perpendicular line being drawn from a point, which is on the surface of the sphere and which has a distance $\rho$ from the central axis, to the tangential surface, $\rho$ denotes the distance from the central axis and is expressed by $\sqrt{x^2+y^2}$, c denotes a curvature of the surface of the -sphere and is expressed by 1/r, and r denotes the radius of the sphere $\Delta Z_0$ which is expressed by $Z_{L0}$-$Z_{P0}$ is equal to or larger than 25 μm, where $\rho_{B0}$ is $\rho$ that satisfies the following expression:

$$dZ_L(\rho)/d\rho = dZ_P(\rho)/d\rho \quad (3)$$

$Z_{L0}$ is expressed by $Z_L(\rho_{B0})$, and $Z_{P0}$ is expressed by $Z_P(\rho_{B0})$.

With this method, the optical element is molded so that the maximum height ($\Delta Z_0$) of the closed space, which is formed between the transfer surface of the mold for forming substantially the same convex surface as the convex surface of the optical element and the spherical molding material being placed on the mold is 25 μm or more. Since the molding material is heated and pressed plural times even when the maximum height of the closed space is 25 μm or more, it is possible to place the molding material on the transfer surface of the mold after a size of the closed space is adjusted so as not to generate the appearance defect prior to each heating/pressing process.

Also, the optical element may be molded from the molding material by performing molding sequentially using a plurality of molds having provided with concave surfaces having different shapes from each others. With this method, the plurality of molds provided with the concave surfaces having different shapes from each others are sequentially used. Thus, it is possible to adjust a size of the closed space prior to each heating/pressing process by selecting a mold having an appropriate concave surface.

Also, the shape of the concave surface of an n-th mold of the plurality of molds may be represented by the following expression which is defined in a coordinate system in which a central axis of the concave surface, which corresponds to the optical axis of the optical element to be molded, is defined as a Z axis and a plane, which is tangential to a vertex of the concave surface and which is perpendicular to the central axis, is defined as an X-Y plane, an X axis being orthogonal to the Z axis, a Y axis being orthogonal to the Z axis and the X axis.

$$Z_{Ln}(\rho) = C_{Ln}\rho^2/(1+\sqrt{1-K_{Ln}C_{Ln}^2\rho^2}) + \Sigma B_{Lni}\rho^i \quad (4)$$

where $Z_{Ln}(\rho)$ denotes a length of a perpendicular line being drawn from a point, which is on the concave surface of the n-th mold and which has a distance $\rho$ from the optical axis, to the tangential surface, $C_{Ln}$ denotes a curvature of the concave surface of the n-th mold surface, $K_{Ln}$ is a constant of the n-th mold surface, and $B_{Lni}$ denotes an i-th order aspheric coefficient of the n-th mold surface A shape of a surface of an n-th mold material before forming the convex surface corresponding to the concave surface may be represented by the following expression which is defined in a coordinate system in which a central axis of the shape of the surface of the n-th mold material, which corresponds to the optical axis of the optical element to be molded, is defined as a Z axis and a plane, which is tangential to a vertex of the shape of the surface of the n-th mold material and which is perpendicular to the central axis, is defined as an X-Y plane, an X axis being orthogonal to the Z axis, a Y axis being orthogonal to the Z axis and the X axis.

$$Z_{Pn}(\rho) = C_{Pn}\rho^2/(1+\sqrt{1-K_{Pn}C_{Pn}^2\rho^2}) + \Sigma B_{Pni}\rho^i \quad (5)$$

where $Z_{Pn}(\rho)$ denotes a length of a perpendicular line being drawn from a point, which is on the convex surface of the n-th mold material and which has a distance $\rho$ from the optical axis, to the tangential surface, $C_{Pn}$ denotes a curvature of the convex surface of the n-th mold material, $K_{Pn}$ denotes a constant of the n-th mold material, and $B_{Pni}$ denotes an i-th order aspheric coefficient of the n-th mold material $\Delta Z_n$ which is expressed by $Z_{Ln}$-$Z_{Pn}$ may be less than 60 μm, where n=1, 2, . . .

$\rho_{Bn}$ is $\rho$ that satisfies $$dZ_{Ln}(\rho)/d\rho = dZ_{Pn}(\rho)/d\rho \quad (6)$$

$Z_{Ln}$ is expressed by $Z_{Ln}(\rho_{Bn})$, and $Z_{Pn}$ is expressed by $Z_{Pn}(\rho_{Bn})$ With this method, the maximum height ($\Delta Z_{1, 2, ...}$) of the closed space, which is formed between the transfer surface of each mold and the molding material being placed on each mold is adjusted to be less than 60 μm. Thereby, a size of the closed space is adjusted to a predetermined size. Thus, it is difficult for gas to remain in the closed space.

Also, the molding material may be molded under vacuum atmosphere. With this method, the molding material is molded under a vacuum atmosphere. Thus, it is difficult for gas to remain in the closed space.

Also, a molds in which $\Delta Z_n$ corresponds to distances less than 25 μm may be employed. With this method, the maximum height ($\Delta Z_{1, 2, \ldots}$) of the closed space, which is formed between the transfer surface of each mold and the molding material being placed on each mold, is adjusted to be less than 25 μm. Thereby, a size of the closed space is adjusted to a predetermined size. Thus, it is difficult for gas to remain in the closed space even if the vacuum molding is not used.

According to another aspect of the invention, an optical element is molded by heating and pressing a glass material. The optical element includes a convex surface having a radius of curvature R smaller than a radius r of a spherical, which has the same volume as the optical element. A shape of the convex surface is expressed by the following expression which is defined in a coordinate system in which an optical axis of the optical element is defined as a Z axis and a plane which is tangential to a vertex of the convex surface and which is perpendicular to the optical axis is defined as an X-Y plane, an X axis being orthogonal to the Z axis and a Y axis being orthogonal to the Z axis and the X axis.

$$Z_L(\rho)=C\rho^2/(1+\sqrt{1-KC^2\rho^2})+\Sigma B_i\rho^i \quad (1)$$

where $Z_L(\rho)$ denotes a length of a perpendicular line being drawn from a point, which is on the convex surface and which has a distance ρ from the optical axis, to the tangential surface, ρ denotes the distance from the optical axis and is expressed by $\sqrt{x^2+y^2}$, C denotes a curvature of the convex surface and is expressed by 1/R R denotes a radius of curvature of the convex surface, K denotes a constant, $B_i$ denotes an i-th order aspheric coefficient, and i denotes a natural number equal to or larger than three A shape of a surface of the sphere is expressed by the following expression which is defined in a coordinate system in which a central axis of the sphere is defined as a Z axis and a plane which is tangential to a vertex of the surface of the sphere and which is perpendicular to the central axis is defined as an X-Y plane, an X axis being orthogonal to the Z axis and a Y axis being orthogonal to the Z axis and the X axis.

$$Z_P(\rho)=c\rho^2/(1+\sqrt{1-c^2\rho^2}) \quad (2)$$

where $Z_P(\rho)$ denotes a length of a perpendicular line being drawn from a point, which is on the surface of the sphere and which has a distance ρ from the central axis, to the tangential surface, ρ denotes the distance from the central axis and is expressed by $\sqrt{x^2+y^2}$, c denotes a curvature of the surface of the sphere and is expressed by 1/r, and r denotes the radius of the sphere $\Delta Z_0$ which is expressed by $Z_{L0}-Z_{P0}$ is equal to or larger than 25 μm, where $\rho_{B0}$ is ρ that satisfies the following expression:

$$dZ_L(\rho)/d\rho=dZ_P(\rho)/d\rho \quad (3)$$

$Z_{L0}$ is expressed by $Z_L(\rho_{B0})$, and $Z_{P0}$ is expressed by $Z_P(\rho_{B0})$ With this configuration, it is possible to obtain the optical element in which the maximum height ($\Delta Z_0$) of the closed space, which is formed between the transfer surface of the mold for forming substantially the same convex surface as the convex surface of the optical element and the spherical molding material being placed on the mold is 25 μm or more. Thereby, it is possible to provide an optical element having large curvature and high NA, which are required for pick-up lenses for optical disks.

According to the above aspects of the invention, it is possible to provide an optical element in which generation of an appearance defect is minimized and an optical element molding method.

DETAILED DESCRIPTION OF EMBODIMENT(S) OF THE INVENTION

Figure 1A:
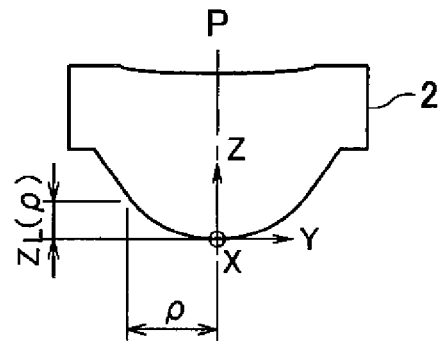
FIG. 1A is an explanatory diagram showing a coordinate system with respect to a convex surface of an optical element.

Hereinafter, suitable embodiments of the invention will be described in detail with reference to the accompanying drawings. In this specification and drawings, the same reference numerals and signs are given to elements having substantially the same functions, and duplicate description thereon will be omitted.

First, for a general press molding method, a problem that is encountered when an optical element is molded by using a mold having a transfer surface having a radius of curvature R smaller than a radius of curvature r of a molding material will be described.

In the press molding method, by using a pair of molds formed of first and second molds having transfer surfaces including an optical transfer surface, the molding material is placed on the transfer surface of the first mold. Next, by the first and second molds, the molding material is heated up to a predetermined temperature equal to or higher than a yield point of the material, and is pressed. Thereby, the transfer surfaces of the first and second molds are transferred to the molding material. Then, when the predetermined pressing is completed, the molding material is cooled down to a predetermined temperature which is equal to or lower than a transformation temperature of the material, and is taken as an optical element from the molds.

When the transfer surface of the first mold has a radius of curvature R smaller than a radius of curvature r of the molding material, the molding material does not come into contact with a center of the transfer surface at the time of placing the molding material, and a closed space is formed between the molding material and the transfer surface of the first mold. Then, when the molding material is pressed in a state where gas remains in the closed space, an appearance defect such as a recess is easily generated in the molded optical element.

Details of a mechanism of generating the appearance defect such as the recess due to the formation of the closed space is not fully understood. However, if the closed space has a predetermined size or less, the appearance defect is hardly generated in the molded optical element.

Accordingly, it is considered that the generation of the appearance defect in the optical element can be suppressed by appropriately adjusting a size of the closed space before the molding material is heated and pressed. Therefore, the inventors performed a verification experiment, and inspected conditions capable of suppressing the generation of the appearance defect in the optical element by adjusting the size of the closed space.

Before the verification experiment is described, definition of the size of the closed space will be described below. In the verification experiment, the size of the closed space is defined as the maximum height $\Delta Z$ of the closed space, which is formed between the molding material and the transfer surface (a concave surface) of the mold.

Figure 1B:
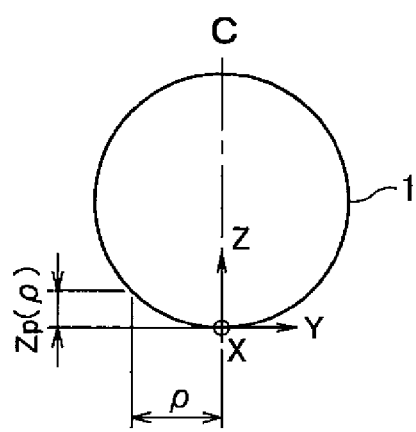
FIG. 1B shows a coordinate system with respect to a surface of a molding material.
Figure 1C:
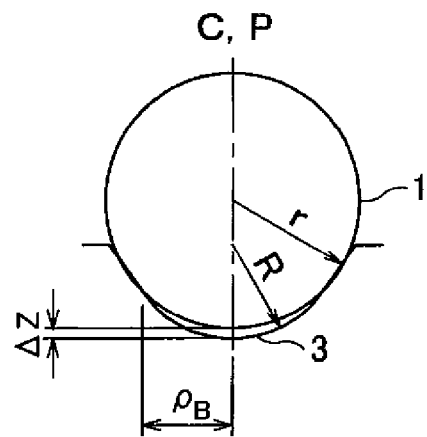
FIG. 1C shows the maximum height of a closed space being formed between the surface of the molding material and the concave surface of the mold.
Figure 2A:
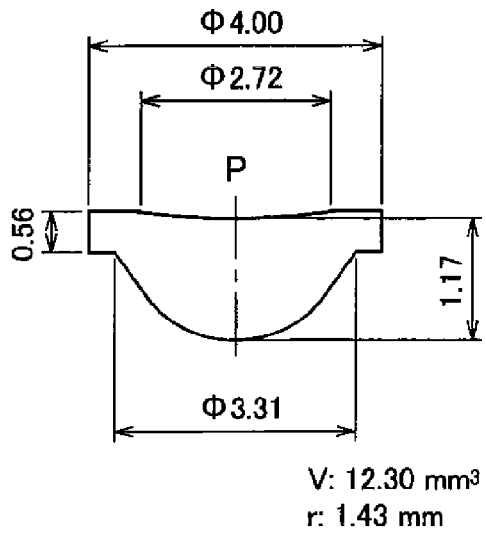
FIGS. 2A to 2D are explanatory diagrams showing shape types of an optical element which are used in verification experiments.
Figure 2B:
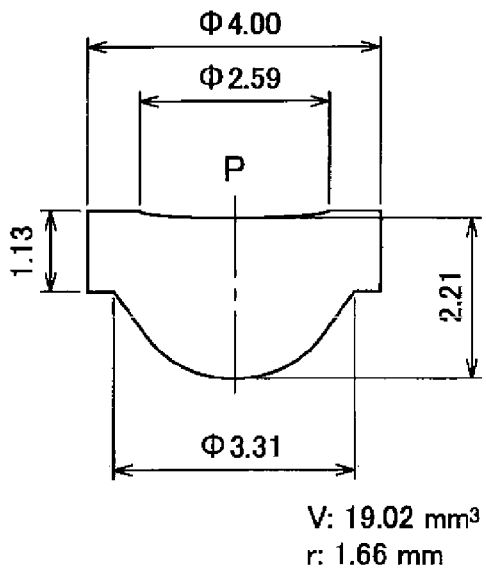
Figure 2C:
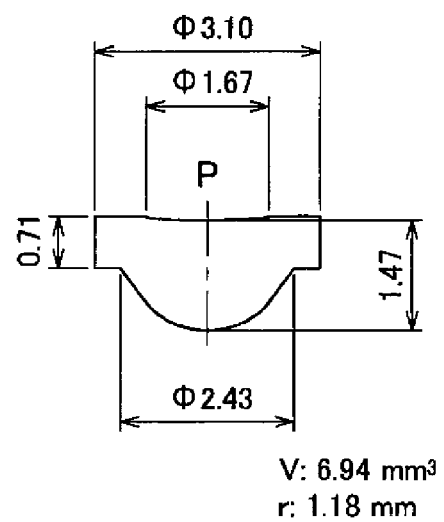
Figure 2D:
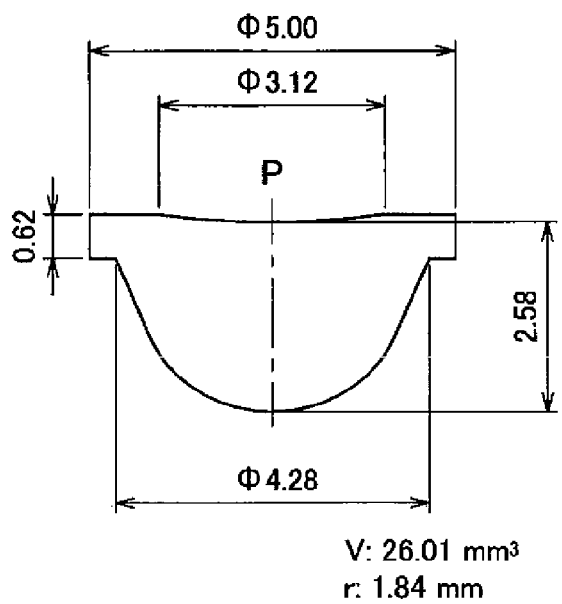

FIG. 1 is an explanatory diagram. FIG. 1A shows a coordinate system with respect to a convex surface of an optical element 2. FIG. 1B shows a coordinate system with respect to a surface of a molding material 1. FIG. 1C shows the maximum height $\Delta Z$ of the closed space, which is formed between the surface of the molding material 1 and a concave surface 3 of the mold. The case where the spherical molding material 1 is employed will be described below. However, it is noted that a shape of the molding material is not limited to the spherical shape.

In a coordinate system in which an optical axis P of the optical element 2 is set as a Z axis and a plane tangential to a vertex of the convex surface (a plane perpendicular to the optical axis P) is set as an X-Y plane (X axis: an axis orthogonal to the Z axis, and Y axis: an axis orthogonal to the Z axis and the X axis), a shape of the convex surface of the optical element 2 corresponding to the concave surface 3 of the mold is represented by the following expression:

$$Z_L(\rho) = C\rho^2/(1+\sqrt{1-KC^2\rho^2}) + \Sigma B_i \rho^i \quad (1)$$

$Z_L(\rho)$ denotes a length of a perpendicular line drawn from a point on the convex surface, which has a distance $\rho$ from the optical axis P, to the tangential surface (the X-Y plane). Also, $\rho$ denotes a distance ($\sqrt{x^2+y^2}$) from the optical axis P, C denotes a curvature of the convex surface (C=1/R, R denotes a radius of curvature of the convex surface), K denotes a constant, $B_i$ denotes an i-th order aspheric coefficient, and i denotes a natural number equal to or larger than three.

In a coordinate system in which a central axis C of the sphere is set as a Z axis and a plane tangential to a vertex of the spherical surface (a plane perpendicular to the central axis C) is set as an X-Y plane (X axis: an axis orthogonal to the Z axis, Y axis: an axis orthogonal to the Z axis and the X axis), a surface shape of the molding material 1 is represented by the following expression:

$$Z_P(\rho) = c\rho^2/(1+\sqrt{1-c^2\rho^2}) \quad (2)$$

$Z_P(\rho)$ denotes a length of a perpendicular line drawn from a point on the spherical surface, which has a distance $\rho$ from the central axis C, to the tangential surface (the X-Y plane). Also, $\rho$ denotes a distance ($\sqrt{x^2+y^2}$) from the central axis C, and c denotes a curvature of the spherical surface (c=1/r, r denotes the radius of the sphere).

On the basis of Expressions (1) and (2), the maximum height $\Delta Z$ of the closed space is represented by the following expression:

$$\Delta Z = Z_P(\rho_B) - Z_L(\rho_B) \quad (3)$$

where $\rho_B$ is defined as a value of $\rho$ which satisfies $dZ_L(\rho)/d\rho = dZ_P(\rho)/d\rho$, In this case, $\rho_B$ is a value other than 0. If $\rho_B$ satisfying this condition is not obtained, a half of an outer diameter of the aspheric-surface portion of the mold is set to $\rho_B$.

Specifically, the distance $\rho_B$ from the optical axis P (the central axis C) is obtained from the condition in which a first derivative of $Z_P(\rho)$ with respect to $\rho$ representing the surface shape of the molding material 1 and a first derivative of $Z_L(\rho)$ with respect to $\rho$ representing the shape of the convex surface of the optical element 2 are equal to each other. Then, the maximum height $\Delta Z$ is calculated as a difference between $Z_P(\rho_B)$ and $Z_L(\rho_B)$ in the case of the distance $\rho_B$.

Hereinafter, a result of the verification experiment will be described. Table 1 shows a result from inspection of a relationship between the maximum height $\Delta Z$ of the closed space and generation of the appearance defect. In the verification experiment, under a normal pressure atmosphere (ordinary pressure atmosphere) and under a vacuum atmosphere, inspected was a relationship between (i) the maximum height $\Delta Z$ of the closed space, which was formed between the molding material 1 (a preform: PF) and the transfer surface 3 of the mold when PF1 is placed, and (ii) transferability of the mold with respect to PF1.

In the following description, a molding process that is performed at an atmospheric pressure under air atmosphere will be referred to as a normal pressure molding or an ordinary pressure molding. Also, a molding process that is performed under a vacuum atmosphere will be referred to as a vacuum molding.

Experiment conditions include 120 patterns in total, in which 12 patterns of combinations among molding temperature (3 patterns), pressure (2 patterns), and pressing speed (2 patterns) are applied to each of patterns (10 patterns) of the PFs having different geometries from each others. Also, as shown in Table 2, the experiment conditions were set based on shape types (shape types A, B, C, and D correspond to FIGS. 2A, 2B, 2C, and 2D, respectively) of the optical element 2 (a lens) shown in FIG. 2. Furthermore, FIG. 2 shows reference dimensions. In the experiment, the spherical PFs having the same volume as the optical elements molded respectively were used with only an outer dimension of a flange among the reference dimensions being changed to the outer diameters of the lens shown in Table 1. Then, 12 molding samples were molded under the experiment conditions for each of the patterns of the PF1, and transferability of the mold 3 was verified.

TABLE 1

| | PF Pattern | | | | | | | | | |
|---|---|---|---|---|---|---|---|---|---|---|
| | 1 | 2 | 3 | 4 | 5 | 6 | 7 | 8 | 9 | 10 |
| PF Volume V (mm³) | 12.30 | 13.06 | 14.07 | 14.86 | 18.58 | 19.31 | 6.83 | 7.11 | 7.40 | 7.68 |
| PF Radius r (mm) | 1.43 | 1.46 | 1.50 | 1.53 | 1.64 | 1.66 | 1.18 | 1.19 | 1.21 | 1.22 |
| Lens Shape Type | A | A | A | A | B | B | C | C | C | C |
| Lens Outer Diameter (mm) | 4.00 | 4.21 | 4.47 | 4.67 | 3.94 | 4.04 | 3.07 | 3.15 | 3.23 | 3.31 |

TABLE 1-continued

|  | PF Pattern | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Maximum Height ΔZ (μm) | 4.68 | 10.01 | 20.01 | 30.02 | 40.01 | 50.04 | 59.99 | 70.02 | 79.94 | 90.03 |
| Transferability (NPM) | ○ | ○ | ○ | Δ | Δ | X | X | X | X | X |
| Transferability (VM) | ○ | ○ | ○ | ○ | ○ | Δ | Δ | X | X | X |

Transferability
○: No recess was generated under all conditions
Δ: Recess was generated under some of conditions
X: Recess was generated under all conditions
NPM: Normal Pressure Molding
VM: Vacuum Molding

TABLE 2

| Lens Shape Type | A, B | C | D |
| --- | --- | --- | --- |
| Glass Transformation Temperatur | 560 | 560 | 390 |
| Glass Yield point (° C.) | 600 | 600 | 415 |
| Molding Temperature (° C.) | 595~600 | 580~600 | 435~450 |
| Pressing Speed (mm/minute) | 6~20 | 6~20 | 6~20 |
| Pressing Force (kgf) | 20~60 | 50~100 | 20~60 |
| Atmospheric Pressure At the time of Vacuum Molding (Pa) | $10^{-1}$~$4 \times 10^{-1}$ | $10^{-1}$~$4 \times 10^{-1}$ | $10^{-1}$~$4 \times 10^{-1}$ |

According to the experiment results shown in Table 1, under the normal pressure atmosphere, it was verified that transferability was good in the range of the maximum height ΔZ less than 30 μm, that transferability in some of the molding conditions was slightly poor in the range of the maximum height ΔZ from 30 to 40 μm, and that transferability was poor in the range of the maximum height ΔZ equal to or larger than 50 μm. Also, under the vacuum atmosphere, it was verified that transferability was good in the range of the maximum height ΔZ equal to or less than 40 μm, that transferability in some of the molding conditions was slightly poor in the range of the maximum height ΔZ from 50 to 60 μm, and that transferability was poor in the range of the maximum height ΔZ equal to or larger than 60 μm.

Accordingly, the inventors found that the appearance defect such as the recess is hardly generated in the optical element, by adjusting the maximum height ΔZ of the closed space to be less than about 20 to 30 μm (less than 25 μm) under the normal pressure atmosphere and adjusting the maximum height ΔZ of the closed space to be less than 50 μm under the vacuum atmosphere. Also, the inventors found that even under vacuum atmosphere, the appearance defect is easily generated in the optical element in the range of the maximum height ΔZ equal to or larger than 60 μm.

Figure 3A:
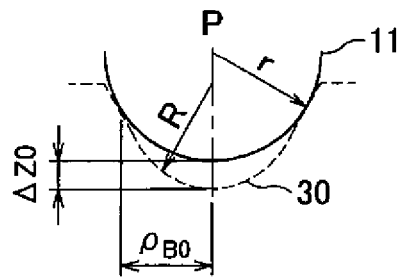
FIG. 3A to 3E are explanatory diagrams showing a molding procedure according to an optical element molding method of an embodiment.
Figure 3B:
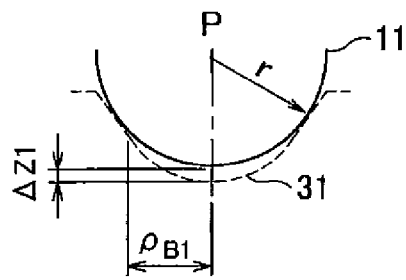
Figure 3C:
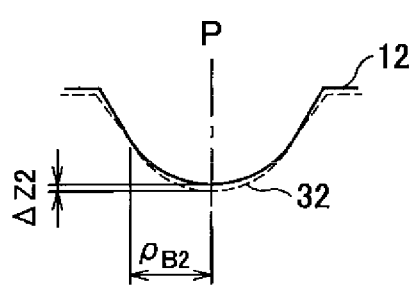
Figure 3D:
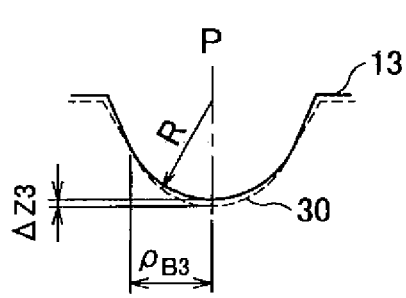
Figure 3E:
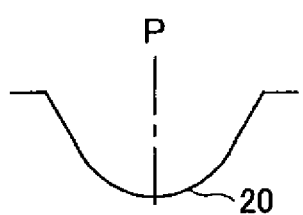

Hereinafter, an optical element molding method according to an embodiment of the invention will be described. FIG. 3 is an explanatory diagram showing a molding procedure based on the optical element molding method according to this embodiment. FIG. 3A shows a relationship between a transfer surface 30 of a final mold and a (primary) molding material 11. FIG. 3B shows a relationship between a transfer surface 31 of a primary mold and the primary molding material 11. FIG. 3C shows a relationship between a transfer surface 32 of a secondary mold and a secondary molding material 12. FIG. 3D shows a relationship between the transfer surface 30 of the final mold and a tertiary molding material 13. FIG. 3E shows a shape of the molded optical element 20.

When molding an optical element 20 having a radius of curvature R smaller than a spherical radius r that is a radius of a sphere having the same volume as the optical element 20 to be molded, the optical element molding method according to this embodiment heats and presses the (primary) molding material 11 plural times.

In the optical element molding method according to the embodiment, plural pairs of molds are employed. FIG. 3 partially shows the first transfer surfaces 30, 31, and 32 of the molds and the molding materials 11, 12, and 13. Hereinafter, for explanatory convenience, described will be the case of using three pairs of molds including two intermediate molds (primary and secondary molds) and a final mold (a tertiary mold). Also, the case of using one pair of molds or three or more pairs of molds as the intermediate molds can be described similarly.

The primary molds are employed to mold the secondary molding material 12, which is a primary molding product, from the primary molding material 11. The secondary molds are employed to mold the tertiary molding material 13, which is a secondary molding product, from the secondary molding material 12. Also, the final molds are employed to mold the optical element 20, which is a final molding product, from the tertiary molding material 13.

The pairs of molds is formed of first and second molds having transfer surfaces including optical transfer surfaces. In the first molds of the primary molding, the secondary molding, and the final molding include the transfer surfaces 31, 32, and 30 having different shapes from each others in order to transfer the transfer surfaces, which are approximate to a molding surface of the optical element 20, to the molding materials 11, 12, and 13. Also, hereinafter, described will be the case where the transfer surfaces of the first molds have different shapes. It is noted that the case where the transfer surfaces of the second molds or the first and second molds have different shapes can be described similarly.

In the optical element molding method according to this embodiment, as a first step, the secondary molding material 12 is molded as a primary molding product from the primary molding material 11 by using the primary molds. As shown in FIG. 3B, the primary molding material 11 is placed on the transfer surface 31 of the primary molds. In this case, selected as the first molds is a molding that is provided with the transfer surface 31 so that the maximum height $\Delta Z_1$ of the closed space, which is formed between the primary molding material 11 and the first mold at the time when the primary molding material 11 is placed, is adjusted to a predetermined height. That is, on the basis of the result of the above verification experiments, the maximum height $\Delta Z_1$ is adjusted to the predetermined height so as to satisfy the condition under which the appearance defect such as the recess is hardly generated in the optical element 20.

A method of selecting the intermediate molds (the primary and the secondary molds) will be described in detail. First, a shape $Z_{Ln}(\rho)$ of a concave surface formed on a selected n-th mold (n=1, 2, . . . ) is represented by the following expression which is defined in a coordinate system in which a central axis of the concave surface corresponding to the optical axis P of the optical element 2 to be molded is defined as a Z axis and a plane tangential to a vertex of the concave surface is defined as an X-Y plane:

$$Z_{Ln}(\rho)=C_{Ln}\rho^2/(1+\sqrt{1-K_{Ln}C_{Ln}^2\rho^2})+\Sigma B_{Lni}\rho^i \quad (4)$$

where $Z_{Ln}(\rho)$ denotes a length of a perpendicular line being drawn from a point, which is on the concave surface of the n-th mold and which has a distance $\rho$ from the optical axis, to the tangential surface (the X-Y plane), $C_{Ln}$ denotes a curvature of the concave surface of the n-th mold surface, $K_{Ln}$ denotes a constant of the n-th mold surface, and $B_{Lni}$ represents an i-th order aspheric coefficient of the n-th mold surface.

Also, the surface shape $Z_{Pn}(\rho)$ of the n-th mold material before forming a convex surface corresponding to the concave surface formed on the n-th mold is represented by the following expression which is defined in a coordinate system in which a central axis of the surface corresponding to the optical axis P of the optical element 2 to be molded is defined as a Z axis and a plane tangential to a vertex of the surface shape is defined as an X-Y plane:

$$Z_{Pn}(\rho)=C_{Pn}\rho^2/(1+\sqrt{1-K_{Pn}C_{Pn}^2\rho^2})+\Sigma B_{Pni}\rho^i \quad (5)$$

where $Z_{Pn}(\rho)$ denotes a length of a perpendicular line being drawn from a point, which is on the convex surface of the n-th mold material and which has a distance $\rho$ from the optical axis, to the tangential surface (the X-Y plane), $C_{Pn}$ denotes a curvature of the convex surface of the n-th mold material $K_{Pn}$ represents a constant of the n-th mold material, and $B_{Pni}$ represents an i-th order aspheric coefficient of the n-th mold material.

It is noted that if the primary molding material 11 has a spherical shape, the surface shape $Z_{P1}(\rho)$ of the primary molding material is represented by the aforementioned Expression (2).

Also, the maximum height $\Delta Z_n$ of the closed space, which is formed between the concave surface provided on the n-th mold and the surface of the n-th order molding material before forming the convex surface corresponding to the concave surface, is expressed by the following expression:

$$\Delta Z_n = Z_{Ln} - Z_{Pn}(n=1, 2, \ldots) \quad (7)$$

where $\rho_{Bn}(\rho_{B1}, \rho_{B2}, \ldots)$ is $\rho$ that makes differential coefficients of the expressions (4) and (5) with respect to $\rho$ coincide with each other, that is, $\rho$ that satisfies $$dZ_{Ln}(\rho)/d\rho = dZ_{Pn}(\rho)/d\rho \quad (6)$$

$Z_{Ln}$ is expressed by $Z_{Ln}(\rho_{Bn})$, and $Z_{Pn}$ is expressed by $Z_{Pn}(\rho_{Bn})$.

The above expressions will be described specifically with reference to the example shown in FIG. 3. For example, the $Z_{L1}(\rho)$ representing the shape of the transfer surface (the concave surface) 31 of the primary mold and the $Z_{P1}(\rho)$ representing the surface (the convex surface) of the primary molding material 11 are differentiated with respect to $\rho$. Then, $\rho$ satisfying Expression (6) in which differential coefficients coincide with each other is obtained as $\rho_{B1}$. Subsequently, the obtained $\rho_{B1}$ is substituted for $\rho$ of $Z_{L1}(\rho)$ and $Z_{P1}(\rho)$, and thus $Z_{L1}(\rho_{B1})$ is obtained as $Z_{L1}$ and $Z_{P1}(\rho_{B1})$ is obtained as $Z_{P1}$. Accordingly, the maximum height $\Delta Z_1$ of the closed space is calculated from Expression (7). Then, depending on the calculated height $\Delta Z_1$ of the closed space, the intermediate molds are selected as follows.

The maximum heights $\Delta Z_2$ and $\Delta Z_3$ of the closed space also are calculated similarly to $\Delta Z_1$. Also, $\Delta Z_1$ represents a relationship between the primary mold and the primary molding material 11, $\Delta Z_2$ represents a relationship between the secondary mold and the secondary molding material 12, and $\Delta Z_3$ represents a relationship between the tertiary mold and the tertiary molding material 13.

If the maximum height $\Delta Z_n$ is not less than 60 μm at the time of selecting an intermediate mold, the condition for suppressing generation of the appearance defect is not satisfied. Thus, a mold to be substituted for the selected mold is selected.

When the vacuum molding is applicable, it is possible to select an intermediate mold having the maximum height $\Delta Z_n$ being less than 60 μm, more preferably less than 50 μm. By using such molds, the condition for suppressing generation of the appearance defect in the vacuum molding is satisfied. Thus, it is possible to mold the intermediate molding material(s) and the optical element from a molding material by using the vacuum molding.

If the vacuum molding is not applicable, it is possible to select an intermediate mold having the maximum height $\Delta Z_n$ being less than 25 μm. By using such molds mentioned above, the condition for suppressing generation of the appearance defect in the normal pressure molding is satisfied. Thus, it is possible to mold the intermediate molding material(s) and the optical element from a molding material by using the normal pressure molding.

Also, when the vacuum molding and the normal pressure molding are applied in combination, it is possible to select an intermediate mold having the maximum height $\Delta Z_n$ being less than 60 μm or less than 25 μm, if necessary. By using such molds, it is possible to select an intermediate mold in accordance with the molding condition.

When a mold is selected as the primary mold according to the selection method described above, the primary molding material 11 is heated up to a predetermined temperature equal to or higher than a yield point of the primary molding material 11 and is pressed by the first and second molds of the selected primary mold. Thereby, the transfer surface 31 of the first mold is at least transferred to the primary molding material 11, and the transfer surface 31, which is formed to render a transferred surface get close to the molding surface of the optical element 20 is transferred. Also, when the predetermined pressing is completed, the primary molding material 11 is cooled down to a predetermined temperature equal to or less than a transformation temperature of the material, and is taken as the secondary molding material 12 from the primary mold.

In this case, the primary mold satisfying the condition for suppressing generation of the appearance defect is employed. Therefore, when the secondary molding material 12 is molded, the secondary molding material 12 that has a molding surface further close to a molding surface of the optical element 20 as compared with the primary molding material 11 can be molded almost without the appearance defect such as the recess.

As a second step, as shown in FIG. 3C, the secondary molding material 12 is placed on the transfer surface 32 of the secondary mold. In this case, similarly to the primary mold, a mold provided with the transfer surface 32 is selected as the secondary mold so that the maximum height $\Delta Z_2$ of the closed space, which is formed between the secondary molding material 12 and the secondary mold at the time when the secondary molding material 12 is placed, is adjusted to a predetermined height. Also, in the second step, the same molding process as that of the first step is performed except that the tertiary molding material 13 is molded from the secondary molding material 12 by using the secondary mold.

The secondary mold satisfying the condition for suppressing generation of the appearance defect is employed. Therefore, when the tertiary molding material 13 is molded, the tertiary molding material 13 that has a molding surface further close to the molding surface of the optical element 20 as compared with the secondary molding material 12 can be molded almost without the appearance defect such as the recess.

As a third step, as shown in FIG. 3D, the tertiary molding material 13 is placed on the transfer surface 30 of the final mold. In this case, it is premised that the tertiary molding material 13 is molded so that the maximum height $\Delta Z_3$ of the closed space, which is formed between the tertiary molding material 13 and the transfer surface 30 of the final mold at the time when the tertiary molding material 13 is placed, is adjusted to a predetermined height. Also, in the third step, the same molding process as that of the first step is performed except that the optical element 20 is molded as a final molding product from the tertiary molding material 13 by using the final mold.

With such a process, the optical element 20 is molded from the tertiary molding material 13, which is molded to satisfy the condition for suppressing generation of the appearance defect. Therefore, it is possible to mold the optical element 20 almost without the appearance defect such as the recess.

As described above, according to the optical element molding method of this embodiment, the molding material is heated and pressed plural times at the time of molding the optical element 20 having the radius of curvature R smaller than the spherical radius r of the sphere having the same volume as the optical element 20 to be molded, that is, the optical element 20 having a relatively small radius of curvature R. In this case, when the molding material is heated and pressed plural times, the molds that regulate sizes of the closed spaces $\Delta Z_1$, $\Delta Z_2$, and $\Delta Z_3$ so that the appearance defect is not generated are selected prior to the heating process and the pressing process for each time. Therefore, it is possible to suppress generation of the appearance defect in the molded optical element 20.

Hereinafter, specific examples of the optical element molding method according to this embodiment will be described. Table 3 is a table showing molding results of the optical elements at the time when the aforementioned optical element molding method is employed. Furthermore, hereinafter, a case of employing a spherical preform (PF) as the primary molding material will be described. It should be noted that a shape of the primary molding material is not limited to the spherical shape.

TABLE 3

| | Sample | | | | | | | |
|---|---|---|---|---|---|---|---|---|
| | 1 | 2 | 3 | 4 | 5 | 6 | 7 | 8 |
| Lens Shape Type | B | B | B | C | C | C | C | D |
| Lens Volume (mm³) | 19.02 | 19.02 | 19.02 | 6.94 | 6.94 | 6.94 | 6.94 | 26.01 |
| PF radius (mm) | 1.66 | 1.66 | 1.66 | 1.18 | 1.18 | 1.18 | 1.18 | 1.84 |
| $\rho_{B0}$ (mm) | 1.219 | 1.219 | 1.219 | 0.927 | 0.927 | 0.927 | 0.927 | 1.550 |
| $\Delta Z_0$ (μm) | 46.01 | 46.01 | 46.01 | 63.87 | 63.87 | 63.87 | 63.87 | 117.78 |
| $\rho_{B1}$ (mm) | 1.138 | 1.215 | 1.092 | 0.833 | 0.786 | 0.927 | 0.927 | 1.548 |
| $\Delta Z_1$ (μm) | 30.12 | 22.84 | 23.89 | 38.60 | 32.46 | 31.96 | 21.31 | 39.80 |
| Primary Molding Condition | VM | NPM | NPM | VM | VM | VM | NPM | VM |
| $\rho_{B2}$ (mm) | 1.578 | 1.222 | 1.601 | 1.054 | 1.191 | 0.926 | 0.926 | 1.553 |
| $\Delta Z_2$ (μm) | 30.71 | 23.17 | 22.40 | 38.90 | 32.65 | 31.92 | 21.27 | 38.99 |
| Secondary Molding Condition | VM | NPM | NPM | VM | VM | VM | NPM | VM |
| $\rho_{B3}$ (mm) | — | — | 1.573 | — | 1.042 | — | 0.926 | 1.554 |
| $\Delta Z_3$ (μm) | — | — | 23.04 | — | 32.54 | — | 21.29 | 39.00 |
| Tertiary Molding Condition | — | — | NPM | — | VM | — | NPM | VM |

*NPM = Normal Pressure Molding
*VM = Vacuum Molding

Table 3 shows molding results of molding samples 1 to 8. In Table 3, the lens shape types B, C, and D correspond to the geometries of the lenses shown in FIGS. 2B, 2C, and 2D, respectively. Also, $\rho_B$ denotes distances from the optical axis P (the central axis C), and is obtained from the condition that first derivatives of $Z_P(\rho)$ with respect to $\rho$ representing the shapes of the convex surfaces of the molding materials 11, 12, and 13 and first derivatives of $Z_L(\rho)$ with respect to $\rho$ representing the surface shapes of the transfer surfaces (the concave surfaces) 31, 32, and 30 of the molds are equal to each other. $\Delta Z$ denotes the maximum heights of the closed spaces, which are formed between the transfer surfaces (the concave surfaces) 31, 32, and 30 of the molds and the convex surfaces of the molding materials 11, 12, and 13. Also, suffixes 0, 1, 2, and 3 of $\rho_B$ and $\Delta Z$ represent a relationship between the final mold and the primary molding material (PF) 11, a relationship between the primary mold and the PF 11, a relationship between the secondary mold (or the final mold) and the secondary molding material 12, and a relationship between the tertiary mold (the final mold) and the tertiary molding material 13, respectively.

Here, by taking several samples, the molding process will be described in detail. As the sample 1, a lens having the shape types B was molded from a spherical PF 11a having a radius of 1.66 mm. In a molding process, first, the maximum height $\Delta Z_0$ of a closed space which was formed between a transfer surface 30*a* of the final mold and the PF11*a* was calculated as about 46 μm. Also, by using a primary mold that was configured so that the maximum height $\Delta Z_1$ is about 30 μm, a secondary molding material 12*a* was molded from the PF11*a* by the vacuum molding. Also, by using a secondary mold (the final mold) that was configured so that the maximum height $\Delta Z_2$ is about 31 μm, a lens 20*a* having a desired shape was molded from the secondary molding material 12*a* by the vacuum molding. In this process, when the secondary molding material 12*a* and the lens 20*a* were molded, the molds satisfying the condition ($\Delta Z < 50$ μm) for suppressing the appearance defect from being generated due to the vacuum molding were employed. Therefore, in the sample 1, it was verified that the appearance defect such as the recess was not generated.

As the sample 3, similarly to the sample 1, the same lens 20*a* was molded from the same PF11*a*. In the sample 3, by using a primary mold that was configured so that the maximum height $\Delta Z_1$ of the closed space was about 24 μm, a secondary molding material 12*b* was molded from the PF11*a* by the normal pressure molding. Then, by using a secondary mold that is configured so that the maximum height $\Delta Z_2$ was about 22 μm, a tertiary molding material 13*b* was molded from the secondary molding material 12*b* by the normal pressure molding. Furthermore, by using a tertiary mold (the final mold) that is configured so that the maximum height $\Delta Z_3$ was about 23 μm, the lens 20*a* having a desired shape was molded from the tertiary molding material 13*b* by the normal pressure molding. In this process, when the secondary molding material 12*b* and the lens 20*a* were molded, the mold satisfying the condition ($\Delta Z < 25$ μm) for suppressing the appearance defect from being generated due to the normal pressure molding were employed. Therefore, in the lens 20*a* of the sample 3, it was also verified that the appearance defect such as the recess was not generated.

Also, specific molding data of the molding samples 1 to 8 is shown in the following Tables 4 to 7. "0.00E$\Delta$" in the tables represents a numerical value "0.00×10$^{\Delta}$".

TABLE 4

| Sample | | 1 | | 2 | |
|---|---|---|---|---|---|
| Lens Shape | | B | | B | |
| Lens Volume | mm³ | 19.02 | | 19.02 | |
| PF radius | mm | 1.66 | | 1.66 | |
| | | Final Mold (Lens) | Primary Mold | Final Mold (Lens) | Primary Mold |
| PC | C | 0.689631 | 0.673468 | 0.689631 | 0.689631 |
| Constant | K | −0.008689 | −0.008689 | −0.008689 | −0.008689 |
| AC | B3 | 0.00E+00 | 0.00E+00 | 0.00E+00 | 0.00E+00 |
| | B4 | 2.57E−02 | 2.39E−02 | 2.57E−02 | −2.71E−01 |
| | B5 | 0.00E+00 | 0.00E+00 | 0.00E+00 | 0.00E+00 |
| | B6 | 2.94E−03 | 2.61E−03 | 2.94E−03 | 1.54E+00 |
| | B7 | 0.00E+00 | 0.00E+00 | 0.00E+00 | 0.00E+00 |
| | B8 | 1.57E−03 | 1.33E−03 | 1.57E−03 | −4.07E+00 |
| | B9 | 0.00E+00 | 0.00E+00 | 0.00E+00 | 0.00E+00 |
| | B10 | −1.46E−03 | −1.18E−03 | −1.46E−03 | 6.23E+00 |
| | B11 | 0.00E+00 | 0.00E+00 | 0.00E+00 | 0.00E+00 |
| | B12 | 9.91E−04 | 7.64E−04 | 9.91E−04 | −5.85E+00 |
| | B13 | 0.00E+00 | 0.00E+00 | 0.00E+00 | 0.00E+00 |
| | B14 | −3.19E−04 | −2.34E−04 | −3.19E−04 | 3.41E+00 |
| | B15 | 0.00E+00 | 0.00E+00 | 0.00E+00 | 0.00E+00 |
| | B16 | 1.87E−05 | 1.31E−05 | 1.87E−05 | −1.20E+00 |
| | B17 | 0.00E+00 | 0.00E+00 | 0.00E+00 | 0.00E+00 |
| | B18 | 0.00E+00 | 0.00E+00 | 0.00E+00 | 2.36E−01 |
| | B19 | 0.00E+00 | 0.00E+00 | 0.00E+00 | 0.00E+00 |
| | B20 | 0.00E+00 | 0.00E+00 | 0.00E+00 | −1.96E−02 |
| $\rho_{B0}$ | mm | 1.219 | | 1.219 | |
| $\Delta Z_0$ | μm | 46.01 | | 46.01 | |
| $\rho_{B1}$ | mm | 1.138 | | 1.215 | |
| $\Delta Z_1$ | μm | 30.12 | | 22.84 | |
| PM | | VM | | NPM | |
| $\rho_{B2}$ | mm | 1.578 | | 1.222 | |
| $\Delta Z_2$ | μm | 30.71 | | 23.17 | |
| SM | | VM | | NPM | |
| $\rho_{B3}$ | mm | — | | — | |
| $\Delta Z_3$ | μm | — | | — | |
| TM | | — | | — | |

*PC: Paraxial Curvature, AC: Aspheric Coefficient
*PM: Primary Molding, SM: Secondary Molding, TM: Tertiary Molding
*NP: Normal Pressure Molding, VM: Vacuum Molding

TABLE 5

| Sample | | 3 | | | 4 | |
|---|---|---|---|---|---|---|
| Lens Shape | | B | | | C | |
| Lens Volume | mm³ | 19.02 | | | 6.94 | |
| PF radius | mm | 1.66 | | | 1.18 | |
| | | Final Mold (Lens) | Primary Mold | Secondary Mold | Final Mold (Lens) | Primary Mold |
| PC | C | 0.689631 | 0.665988 | 0.677437 | 1.020043 | 1.020043 |
| Constant | K | −0.008689 | −0.008689 | −0.008689 | 0.026191 | 0.026191 |
| AC | B3 | 0.00E+00 | 0.00E+00 | 0.00E+00 | −1.64E−03 | −1.17E−03 |
| | B4 | 2.57E−02 | 2.31E−02 | 2.44E−02 | 8.70E−02 | 5.23E−02 |
| | B5 | 0.00E+00 | 0.00E+00 | 0.00E+00 | −1.01E−02 | −5.11E−03 |
| | B6 | 2.94E−03 | 2.47E−03 | 2.69E−03 | −3.87E−02 | −1.66E−02 |
| | B7 | 0.00E+00 | 0.00E+00 | 0.00E+00 | 1.39E−01 | 5.02E−02 |
| | B8 | 1.57E−03 | 1.23E−03 | 1.39E−03 | 1.31E−02 | 3.99E−03 |
| | B9 | 0.00E+00 | 0.00E+00 | 0.00E+00 | −1.27E−01 | −3.27E−02 |
| | B10 | −1.46E−03 | −1.07E−03 | −1.24E−03 | −9.62E−02 | −2.09E−02 |
| | B11 | 0.00E+00 | 0.00E+00 | 0.00E+00 | 6.26E−02 | 1.15E−02 |
| | B12 | 9.91E−04 | 6.75E−04 | 8.15E−04 | 1.52E−01 | 2.34E−02 |
| | B13 | 0.00E+00 | 0.00E+00 | 0.00E+00 | 1.47E−01 | 1.91E−02 |
| | B14 | −3.19E−04 | −2.03E−04 | −2.53E−04 | −1.52E−01 | −1.68E−02 |
| | B15 | 0.00E+00 | 0.00E+00 | 0.00E+00 | −2.81E−01 | −2.61E−02 |
| | B16 | 1.87E−05 | 1.11E−05 | 1.43E−05 | 2.01E−01 | 1.58E−02 |
| | B17 | 0.00E+00 | 0.00E+00 | 0.00E+00 | 0.00E+00 | 0.00E+00 |

TABLE 5-continued

|   |   |   |   |   |   |   |
|---|---|---|---|---|---|---|
| | B18 | 0.00E+00 | 0.00E+00 | 0.00E+00 | 0.00E+00 | 0.00E+00 |
| | B19 | 0.00E+00 | 0.00E+00 | 0.00E+00 | 0.00E+00 | 0.00E+00 |
| | B20 | 0.00E+00 | 0.00E+00 | 0.00E+00 | 0.00E+00 | 0.00E+00 |
| $\rho_{B0}$ | mm | 1.219 | | | 0.927 | |
| $\Delta Z_0$ | μm | 46.01 | | | 63.87 | |
| $\rho_{B1}$ | mm | 1.092 | | | 0.833 | |
| $\Delta Z_1$ | μm | 23.89 | | | 38.60 | |
| PM | | NPM | | | | VM |
| $\rho_{B2}$ | mm | 1.601 | | | 1.054 | |
| $\Delta Z_2$ | μm | 22.40 | | | 38.90 | |
| SM | | NPM | | | | VM |
| $\rho_{B3}$ | mm | 1.573 | | | — | |
| $\Delta Z_3$ | μm | 23.04 | | | — | |
| TM | | NPM | | | — | |

*PC: Paraxial Curvature, AC: Aspheric Coefficient
*PM: Primary Molding, SM: Secondary Molding, TM: Tertiary Molding
*NPM: Normal Pressure Molding, VM: Vacuum Molding

TABLE 6

| | | | | | | |
|---|---|---|---|---|---|---|
| | Sample | | 5 | | 6 | |
| | Lens Shape | | C | | C | |
| | Lens Volume | mm³ | 6.94 | | 6.94 | |
| | PF radius | mm | 1.18 | | 1.18 | |
| | | Final Mold (Lens) | Primary Mold | Secondary Mold | Final Mold (Lens) | Primary Mold |
| PC | C | 1.020043 | 1.020043 | 1.020043 | 1.020043 | 1.020043 |
| Constant | K | 0.026191 | 0.026191 | 0.026191 | 0.026191 | 0.026191 |
| AC | B3 | −1.64E−03 | −9.64E−04 | −1.23E−03 | −1.64E−03 | −1.16E+00 |
| | B4 | 8.70E−02 | 3.93E−02 | 5.69E−02 | 8.70E−02 | 1.31E+01 |
| | B5 | −1.01E−02 | −3.50E−03 | −5.72E−03 | −1.01E−02 | −8.12E+01 |
| | B6 | −3.87E−02 | −1.03E−02 | −1.91E−02 | −3.87E−02 | 3.14E+02 |
| | B7 | 1.39E−01 | 2.84E−02 | 5.94E−02 | 1.39E−01 | −7.75E+02 |
| | B8 | 1.31E−02 | 2.05E−03 | 4.86E−03 | 1.31E−02 | 1.19E+03 |
| | B9 | −1.27E−01 | −1.53E−02 | −4.10E−02 | −1.27E−01 | −9.82E+02 |
| | B10 | −9.62E−02 | −8.88E−03 | −2.69E−02 | −9.62E−02 | 1.41E+02 |
| | B11 | 6.26E−02 | 4.44E−03 | 1.52E−02 | 6.26E−02 | 4.35E+02 |
| | B12 | 1.52E−01 | 8.25E−03 | 3.20E−02 | 1.52E−01 | −3.11E+02 |
| | B13 | 1.47E−01 | 6.12E−03 | 2.69E−02 | 1.47E−01 | 2.21E+02 |
| | B14 | −1.52E−01 | −4.88E−03 | −2.42E−02 | −1.52E−01 | −4.34E+02 |
| | B15 | −2.81E−01 | −6.92E−03 | −3.88E−02 | −2.81E−01 | 3.51E+02 |
| | B16 | 2.01E−01 | 3.79E−03 | 2.41E−02 | 2.01E−01 | −9.85E+01 |
| | B17 | 0.00E+00 | 0.00E+00 | 0.00E+00 | 0.00E+00 | 1.93E+02 |
| | B18 | 0.00E+00 | 0.00E+00 | 0.00E+00 | 0.00E+00 | −3.41E+02 |
| | B19 | 0.00E+00 | 0.00E+00 | 0.00E+00 | 0.00E+00 | 2.14E+02 |
| | B20 | 0.00E+00 | 0.00E+00 | 0.00E+00 | 0.00E+00 | −4.64E+01 |
| $\rho_{B0}$ | mm | 0.927 | | | 0.927 | |
| $\Delta Z_0$ | μm | 63.87 | | | 63.87 | |
| $\rho_{B1}$ | mm | 0.786 | | | 0.927 | |
| $\Delta Z_1$ | μm | 32.46 | | | 31.96 | |
| PM | | VM | | | VM | |
| $\rho_{B2}$ | mm | 1.191 | | | 0.926 | |
| $\Delta Z_2$ | μm | 32.65 | | | 31.92 | |
| SM | | VM | | | VM | |
| $\rho_{B3}$ | mm | 1.042 | | | — | |
| $\Delta Z_3$ | μm | 32.54 | | | — | |
| TM | | VM | | | — | |

*PC: Paraxial Curvature, AC: Aspheric Coefficient
*PM: Primary Molding, SM: Secondary Molding, TM: Tertiary Molding
*VM: Vacuum Molding

TABLE 7

| | | FMD (Lens) | Primary Mold | Secondary Mold | FMD (Lens) | Primary Mold | Secondary Mold |
|---|---|---|---|---|---|---|---|
| Sample | | | | | 7 | 8 | |
| Lens Shape | | | | | C | D | |
| LV | mm³ | | | | 6.94 | 26.01 | |
| PF radius | mm | | | | 1.18 | 1.84 | |
| PC | C | 1.020043 | 1.020043 | 1.020043 | 0.665963 | 0.665963 | 0.665963 |
| Constant | K | 0.026191 | 0.026191 | 0.026191 | 0.148548 | 0.148548 | 0.148548 |
| AC | B3 | −1.64E−03 | −1.55E+00 | −7.75E−01 | 0.00E+00 | 0.00E+00 | 0.00E+00 |
| | B4 | 8.70E−02 | 1.74E+01 | 8.74E+00 | 1.46E−02 | −4.17E−01 | −2.01E−01 |
| | B5 | −1.01E−02 | −1.08E+02 | −5.41E+01 | 0.00E+00 | 0.00E+00 | 0.00E+00 |
| | B6 | −3.87E−02 | 4.19E+02 | 2.09E+02 | 1.25E−03 | 1.71E+00 | 8.55E−01 |
| | B7 | 1.39E−01 | −1.03E+03 | −5.17E+02 | 0.00E+00 | 0.00E+00 | 0.00E+00 |
| | B8 | 1.31E−02 | 1.58E+03 | 7.92E+02 | 2.03E−03 | −3.45E+00 | −1.73E+00 |
| | B9 | −1.27E−01 | −1.31E+03 | −6.54E+02 | 0.00E+00 | 0.00E+00 | 0.00E+00 |
| | B10 | −9.62E−02 | 1.88E+02 | 9.39E+01 | −1.29E−03 | 4.05E+00 | 2.03E+00 |
| | B11 | 6.26E−02 | 5.80E+02 | 2.90E+02 | 0.00E+00 | 0.00E+00 | 0.00E+00 |
| | B12 | 1.52E−01 | −4.15E+02 | −2.07E+02 | 6.13E−04 | −2.92E+00 | −1.46E+00 |
| | B13 | 1.47E−01 | 2.95E+02 | 1.47E+02 | 0.00E+00 | 0.00E+00 | 0.00E+00 |
| | B14 | −1.52E−01 | −5.78E+02 | −2.89E+02 | −1.41E−04 | 1.31E+00 | 6.53E−01 |
| | B15 | −2.81E−01 | 4.68E+02 | 2.34E+02 | 0.00E+00 | 0.00E+00 | 0.00E+00 |
| | B16 | 2.01E−01 | −1.31E+02 | −6.56E+01 | 1.31E−05 | −3.54E−01 | −1.77E−01 |
| | B17 | 0.00E+00 | 2.58E+02 | 1.29E+02 | 0.00E+00 | 0.00E+00 | 0.00E+00 |
| | B18 | 0.00E+00 | −4.55E+02 | −2.28E+02 | 0.00E+00 | 5.33E−02 | 2.67E−02 |
| | B19 | 0.00E+00 | 2.86E+02 | 1.43E+02 | 0.00E+00 | 0.00E+00 | 0.00E+00 |
| | B20 | 0.00E+00 | −6.19E+01 | −3.09E+01 | 0.00E+00 | −3.41E−03 | −1.70E−03 |
| $\rho_{B0}$ | mm | 0.927 | | | 1.550 | | |
| $\Delta Z_0$ | μm | 63.87 | | | 117.78 | | |
| $\rho_{B1}$ | mm | 0.927 | | | 1.548 | | |
| $\Delta Z_1$ | μm | 21.31 | | | 39.80 | | |
| PM | | NPM | | | VM | | |
| $\rho_{B2}$ | mm | 0.926 | | | 1.553 | | |
| $\Delta Z_2$ | μm | 21.27 | | | 38.99 | | |
| SM | | NPM | | | VM | | |
| $\rho_{B3}$ | mm | 0.926 | | | 1.554 | | |
| $\Delta Z_3$ | μm | 21.29 | | | 39.00 | | |
| TM | | NPM | | | VM | | |

*PC: Paraxial Curvature, AC: Aspheric Coefficient
*FMD: Final Molding
*PM: Primary Molding, SM: Secondary Molding, TM: Tertiary Molding
*NPM: Normal Pressure Molding, VM: Vacuum Molding The suitable embodiments of the invention have been described above with reference to the accompanying drawings. However, the invention is not limited to the examples mentioned above. It will be readily apparent to those skilled in the art that various modifications and derivations can be made within the scope of the technical idea described in claims and that such modifications and derivations also belong to the technical scope of the invention.

For example, in the above description, shown is the case where the molds are selected by using the maximum height $\Delta Z$ of the closed space as an index. However, instead of the maximum height $\Delta Z$, another index such as the distance $\rho_B$ or the volume of the closed space that unambiguously represents a size of the closed space may be used.

What is claimed is:

1. An optical element molding method, comprising:
heating and pressing a molding material plural times when molding an optical element having a radius of curvature R smaller than r, wherein r denotes a radius of a sphere having the same volume as the optical element to be molded, wherein
the optical element has at least one convex surface, and
a shape of the optical element is expressed by the following expression which is defined in a coordinate system in which an optical axis of the optical element is defined as a Z axis and a plane which is tangential to a vertex of the convex surface and which is perpendicular to the optical axis is defined as an X-Y plane, an X axis being orthogonal to the Z axis and a Y axis being orthogonal to the Z axis and the X axis:

$$Z_L(\rho) = C\rho^2/(1+\sqrt{1-KC^2\rho^2}) + \Sigma B_i \rho^i \quad (1)$$

where $Z_L(\rho)$ denotes a length of a perpendicular line being drawn from a point, which is on the convex surface and which has a distance $\rho$ from the optical axis, to the tangential surface, $\rho$ denotes the distance from the optical axis and is expressed by $\sqrt{x^2+y^2}$, C denotes a curvature of the convex surface and is expressed by 1/R R denotes a radius of curvature of the convex surface, K denotes a constant, $B_i$ denotes an i-th order aspheric coefficient, and i denotes a natural number equal to or larger than three, a shape of a surface of the sphere is expressed by the following expression which is defined in a coordination system in which a central axis of the sphere is defined as a Z axis and a plane which is tangential to a vertex of the surface of the sphere and which is perpendicular to the central axis is defined as an X-Y plane, an X axis being orthogonal to the Z axis and a Y axis being orthogonal to the Z axis and the X axis:

$$Z_P(\rho)=c\rho^2/(1+\sqrt{1-c^2\rho^2}) \quad (2)$$

where
- $Z_P(\rho)$ denotes a length of a perpendicular line being drawn from a point, which is on the surface of the sphere and which has a distance $\rho$ from the central axis, to the tangential surface,
- $\rho$ denotes the distance from the central axis and is expressed by $\sqrt{x^2+y^2}$,
- c denotes a curvature of the surface of the sphere and is expressed by 1/r, and
- r denotes the radius of the sphere, and
- $\Delta Z_0$ which is expressed by $Z_{L0}$-$Z_{P0}$ is equal to or larger than 25 μm, where
$\rho_{B0}$ is $\rho$ that satisfies the following expression:

$$dZ_L(\rho)/d\rho=dZ_P(\rho)/d\rho \quad (3)$$

$Z_{L0}$ is expressed by $Z_L(\rho_{B0})$, and
$Z_{P0}$ is expressed by $Z_P(\rho_{B0})$.

2. The optical element molding method according to claim 1, wherein the optical element is molded from the molding material by performing molding sequentially using a plurality of molds having provided with concave surfaces having different shapes from each others.

3. The optical element molding method according to claim 2, wherein
the shape of the concave surface of an n-th mold of the plurality of molds is represented by the following expression which is defined in a coordinate system in which a central axis of the concave surface, which corresponds to the optical axis of the optical element to be molded, is defined as a Z axis and a plane, which is tangential to a vertex of the concave surface and which is perpendicular to the central axis, is defined as an X-Y plane, an X axis being orthogonal to the Z axis, a Y axis being orthogonal to the Z axis and the X axis:

$$Z_{Ln}(\rho)=C_{Ln}\rho^2/(1+\sqrt{1-K_{Ln}C_{Ln}^2\rho^2})+\Sigma B_{Lni}\rho^i \quad (4)$$

where
- $Z_{Ln}(\rho)$ denotes a length of a perpendicular line being drawn from a point, which is on the concave surface of the n-th mold and which has a distance $\rho$ from the optical axis, to the tangential surface,
- $C_{Ln}$ denotes a curvature of the concave surface of the n-th mold surface,
- $K_{Ln}$ is a constant of the n-th mold surface, and
- $B_{Lni}$ denotes an i-th order aspheric coefficient of the n-th mold surface,
- a shape of a surface of an n-th mold material before forming the convex surface corresponding to the concave surface is represented by the following expression which is defined in a coordinate system in which a central axis of the shape of the surface of the n-th mold material, which corresponds to the optical axis of the optical element to be molded, is defined as a Z axis and a plane, which is tangential to a vertex of the shape of the surface of the n-th mold material and which is perpendicular to the central axis, is defined as an X-Y plane, an X axis being orthogonal to the Z axis, a Y axis being orthogonal to the Z axis and the X axis:

$$Z_{Pn}(\rho)=C_{Pn}\rho^2/(1+\sqrt{1-K_{Pn}C_{Pn}^2\rho^2})+\Sigma B_{Pni}\rho^i \quad (5)$$

where
$Z_{Pn}(\rho)$ denotes a length of a perpendicular line being drawn from a point, which is on the convex surface of the n-th mold material and which has a distance $\rho$ from the optical axis, to the tangential surface,
$C_{Pn}$ denotes a curvature of the convex surface of the n-th mold material,
$K_{Pn}$ denotes a constant of the n-th mold material, and
$B_{Pni}$ denotes an i-th order aspheric coefficient of the n-th mold material, and
$\Delta Z_n$ which is expressed by $Z_{Ln\text{-}ZPn}$ is less than 60 μm,
where
n =1, 2, . . .
$\rho_{Bn}$ is $\rho$ that satisfies $$dZ_{Ln}(\rho)/d\rho=dZ_{Pn}(\rho)/d\rho \quad (6)$$

$Z_{Ln}$ is expressed by $Z_{Ln}(\rho_{Bn})$, and
$Z_{Pn}$ is expressed by $Z_{Pn}(\rho_{Bn})$.

4. The optical element molding method according to claim 3, wherein the molding material is molded under a vacuum atmosphere.

5. The optical element molding method according to claim 3, wherein a molds in which $\Delta Z_n$ corresponds to distances less than 25 μm are employed.

6. An optical element molding method, comprising:
heating and pressing a molding material plural times when molding an optical element having a radius of curvature R smaller than r, wherein r denotes a radius of a sphere having the same volume as the optical element to be molded, the optical element being molded from the molding material by performing molding sequentially using a plurality of molds having provided with concave surfaces having different shapes from each other, wherein
the shape of the concave surface of an n-th mold of the plurality of molds is represented by the following expression which is defined in a coordinate system in which a central axis of the concave surface, which corresponds to the optical axis of the optical element to be molded, is defined as a Z axis and a plane, which is tangential to a vertex of the concave surface and which is perpendicular to the central axis, is defined as an X-Y plane, an X axis being orthogonal to the Z axis, a Y axis being orthogonal to the Z axis and the X axis:

$$Z_{Ln}(\rho)=C_{Ln}\rho^2/(1+\sqrt{1-K_{Ln}C_{Ln}^2\rho^2})+\Sigma B_{Lni}\rho^i \quad (4)$$

where
$Z_{Ln}(\rho)$ denotes a length of a perpendicular line being drawn from a point, which is on the concave surface of the n-th mold and which has a distance $\rho$ from the optical axis, to the tangential surface,
$C_{Ln}$ denotes a curvature of the concave surface of the n-th mold surface,
$K_{Ln}$ is a constant of the n-th mold surface, and
$B_{Lni}$ denotes an i-th order aspheric coefficient of the n-th mold surface,
a shape of a surface of an n-th mold material before forming the convex surface corresponding to the concave surface is represented by the following expression which is defined in a coordinate system in which a central axis of the shape of the surface of the n-th mold material, which corresponds to the optical axis of the optical element to be molded, is defined as a Z axis and a plane, which is tangential to a vertex of the shape of the surface of the n-th mold material and which is perpendicular to the central axis, is defined as an X-Y plane, an X axis being orthogonal to the Z axis, a Y axis being orthogonal to the Z axis and the X axis:

$$Z_{Pn}(\rho)=C_{Pn}\rho^2/(1+\sqrt{1-K_{Pn}C_{Pn}^2\rho^2})+\Sigma B_{Pni}\rho^i \quad (5)$$

where $Z_{Pn}(\rho)$ denotes a length of a perpendicular line being drawn from a point, which is on the convex surface of the n-th mold material and which has a distance $\rho$ from the optical axis, to the tangential surface, $C_{Pn}$ denotes a curvature of the convex surface of the n-th mold material, $K_{Pn}$ denotes a constant of the n-th mold material, and $B_{Pni}$ denotes an n-th order aspheric coefficient of the n-th mold material, and $\Delta Z_n$ which is expressed by $Z_{Ln}$-$Z_{Pn}$ is less than 60 μm, where n=1, 2, . . .

$\rho_{Bn}$ is $\rho$ that satisfies $$dZ_{Ln}(\rho)/d\rho = dZ_{Pn}(\rho)/d\rho \qquad (6)$$

$Z_{Ln}$ is expressed by $Z_{Ln}(\rho_{Bn})$, and $Z_{Pn}$ is expressed by $Z_{Pn(\rho Bn)}$.

7. The optical element molding method according to claim 6, wherein the molding material is molded under a vacuum atmosphere.

8. The optical element molding method according to claim 6, wherein a molds in which $\Delta Z_n$ corresponds to distances less than 25 μm are employed.

9. An optical element molded by heating and pressing a glass material, the optical element comprising:

a convex surface having a radius of curvature R smaller than a radius r of a spherical, which has the same volume as the optical element, wherein a shape of the convex surface is expressed by the following expression which is defined in a coordinate system in which an optical axis of the optical element is defined as a Z axis and a plane which is tangential to a vertex of the convex surface and which is perpendicular to the optical axis is defined as an X-Y plane, an X axis being orthogonal to the Z axis and a Y axis being orthogonal to the Z axis and the X axis:

$$Z_L(\rho) = C\rho^2/(1+\sqrt{1-KC^2\rho^2}) + \Sigma B_i \rho^i \qquad (1)$$

where $Z_L(\rho)$ denotes a length of a perpendicular line being drawn from a point, which is on the convex surface and which has a distance $\rho$ from the optical axis, to the tangential surface, $\rho$ denotes the distance from the optical axis and is expressed by $\sqrt{x^2+y^2}$, C denotes a curvature of the convex surface and is expressed by 1/R R denotes a radius of curvature of the convex surface, K denotes a constant, $B_i$ denotes an i-th order aspheric coefficient, and i denotes a natural number equal to or larger than three, a shape of a surface of the sphere is expressed by the following expression which is defined in a coordination system in which a central axis of the sphere is defined as a Z axis and a plane which is tangential to a vertex of the surface of the sphere and which is perpendicular to the central axis is defined as an X-Y plane, an X axis being orthogonal to the Z axis and a Y axis being orthogonal to the Z axis and the X axis:

$$Z_P(\rho) = c\rho^2/(1+\sqrt{1-c^2\rho^2}) \qquad (2)$$

where $Z_P(\rho)$ denotes a length of a perpendicular line being drawn from a point, which is on the surface of the sphere and which has a distance $\rho$ from the central axis, to the tangential surface, $\rho$ denotes the distance from the central axis and is expressed by $\sqrt{x^2+y^2}$, c denotes a curvature of the surface of the sphere and is expressed by 1/r, and r denotes the radius of the sphere, and $\Delta Z_0$ which is expressed by $Z_{L0}$-$Z_{P0}$ is equal to or larger than 25 μm, where $\rho_{B0}$ is $\rho$ that satisfies the following expression:

$$dZ_L(\rho)/d\rho = dZ_P(\rho)/d\rho \qquad (3)$$

$Z_{L0}$ is expressed by $Z_L(\rho_{B0})$, and $Z_{P0}$ is expressed by $Z_P(\rho_{B0})$.

* * * * *